No. 781,715. PATENTED FEB. 7, 1905.
S. E. DAVIS.
SEED DRILL.
APPLICATION FILED JUNE 21, 1904.

4 SHEETS—SHEET 1.

Witnesses.
A. H. Opsahl.
E. W. Jeppesen.

Inventor.
Spencer E. Davis
By his Attorneys.
Williamson & Merchant.

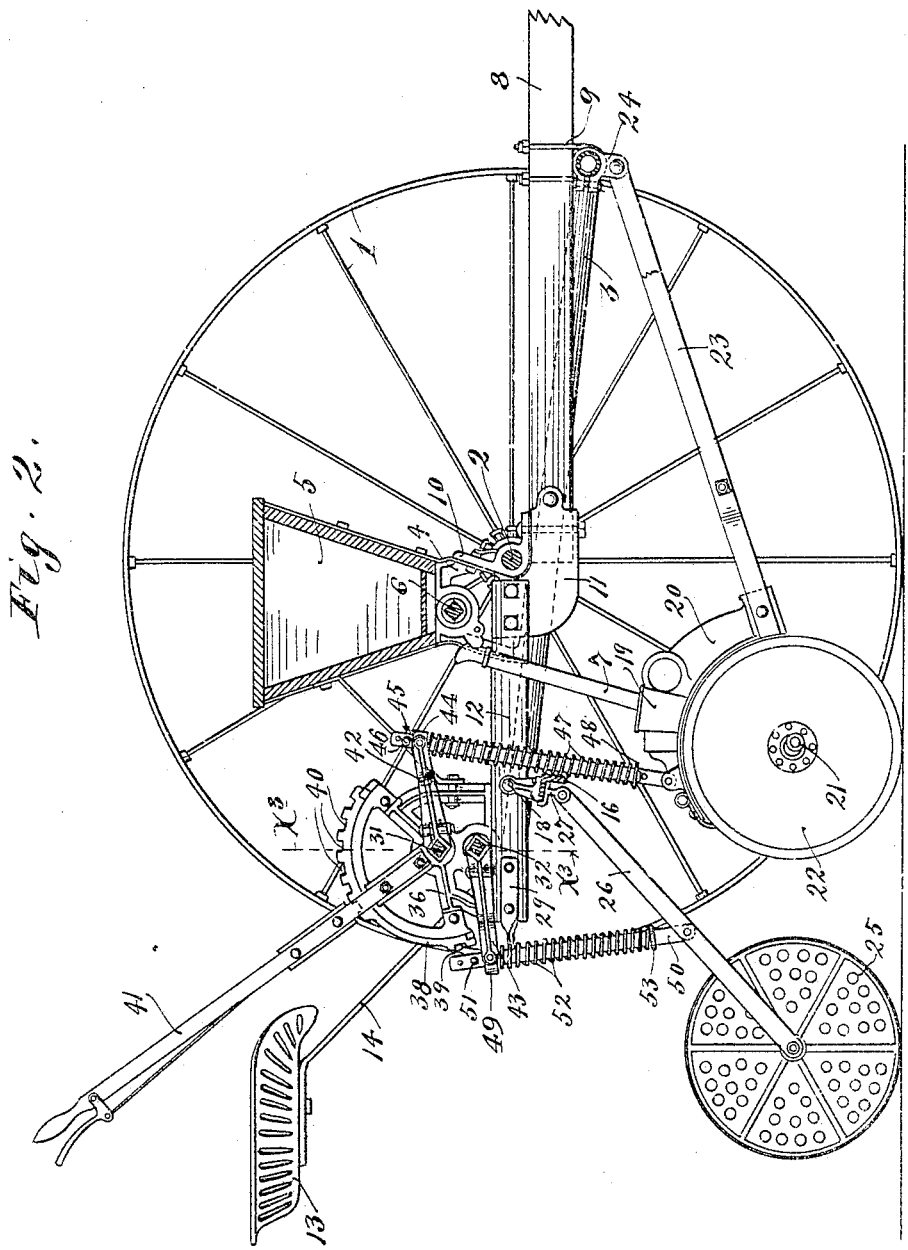

No. 781,715. PATENTED FEB. 7, 1905.
S. E. DAVIS.
SEED DRILL.
APPLICATION FILED JUNE 21, 1904.
4 SHEETS—SHEET 3.
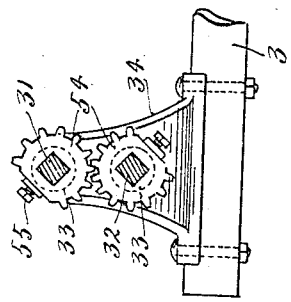
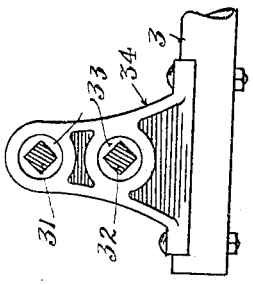
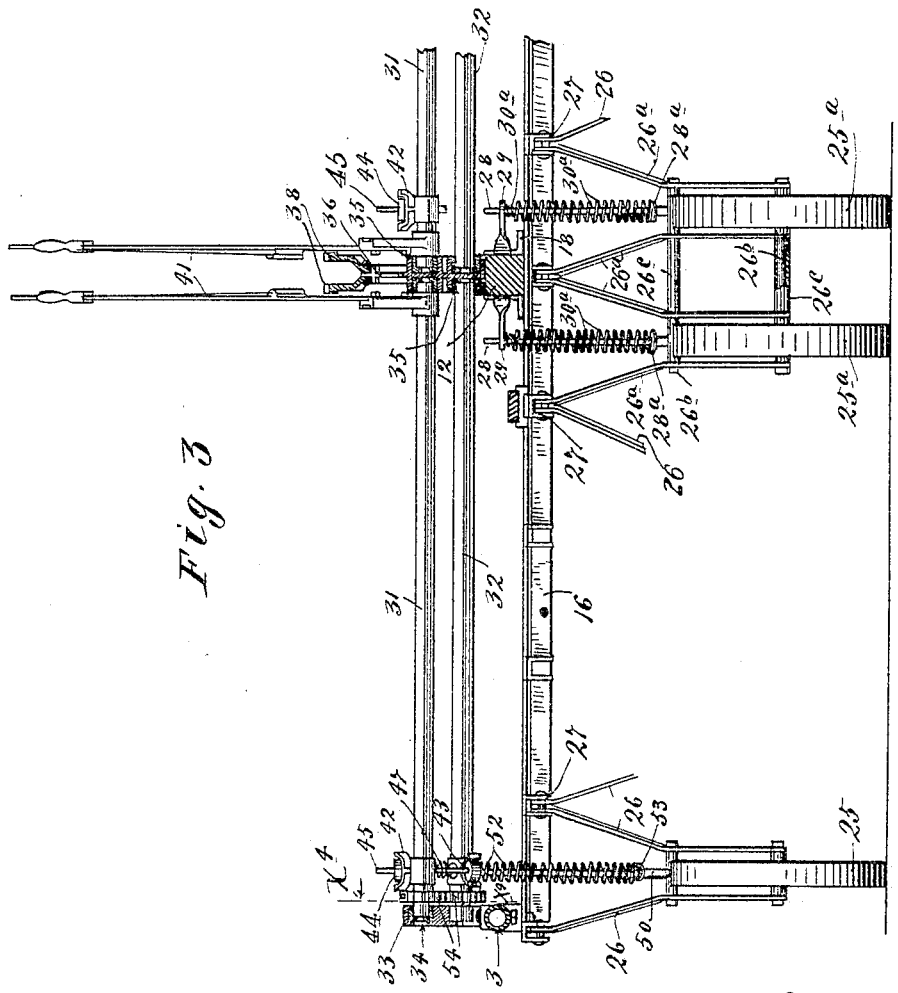
Witnesses
A. H. Opsahl.
E. W. Jeppesen.
Inventor
Spencer E. Davis.
By his Attorneys.
Williamson & Merchant No. 781,715. PATENTED FEB. 7, 1905.
S. E. DAVIS.
SEED DRILL.
APPLICATION FILED JUNE 21, 1904.

4 SHEETS—SHEET 4.

Witnesses
A. H. Opsahl.
E. W. Jeppesen.

Inventor.
Spencer E. Davis
By his Attorneys.
Williamson & Merchant

No. 781,715. Patented February 7, 1905.

UNITED STATES PATENT OFFICE.

SPENCER E. DAVIS, OF MINNEAPOLIS, MINNESOTA, ASSIGNOR TO THE MONITOR DRILL COMPANY, OF ST. LOUIS PARK, MINNESOTA, A CORPORATION OF MINNESOTA.

SEED-DRILL.

SPECIFICATION forming part of Letters Patent No. 781,715, dated February 7, 1905.

Application filed June 21, 1904. Serial No. 213,547.

*To all whom it may concern:*

Be it known that I, SPENCER E. DAVIS, a citizen of the United States, residing at Minneapolis, in the county of Hennepin and State of Minnesota, have invented certain new and useful Improvements in Seed-Drills; and I do hereby declare the following to be a full, clear, and exact description of the invention, such as will enable others skilled in the art to which it appertains to make and use the same.

My present invention relates to seeding-machines, and especially to those having furrow-openers, such as disks, shoes, or hoes; and it has for its object to improve this class of machines in the several particulars hereinafter noted.

To the above ends the invention consists of the novel devices and combination of devices hereinafter described, and defined in the claims.

The invention is illustrated in the accompanying drawings, wherein like characters indicate like parts throughout the several views.

Figure 1:
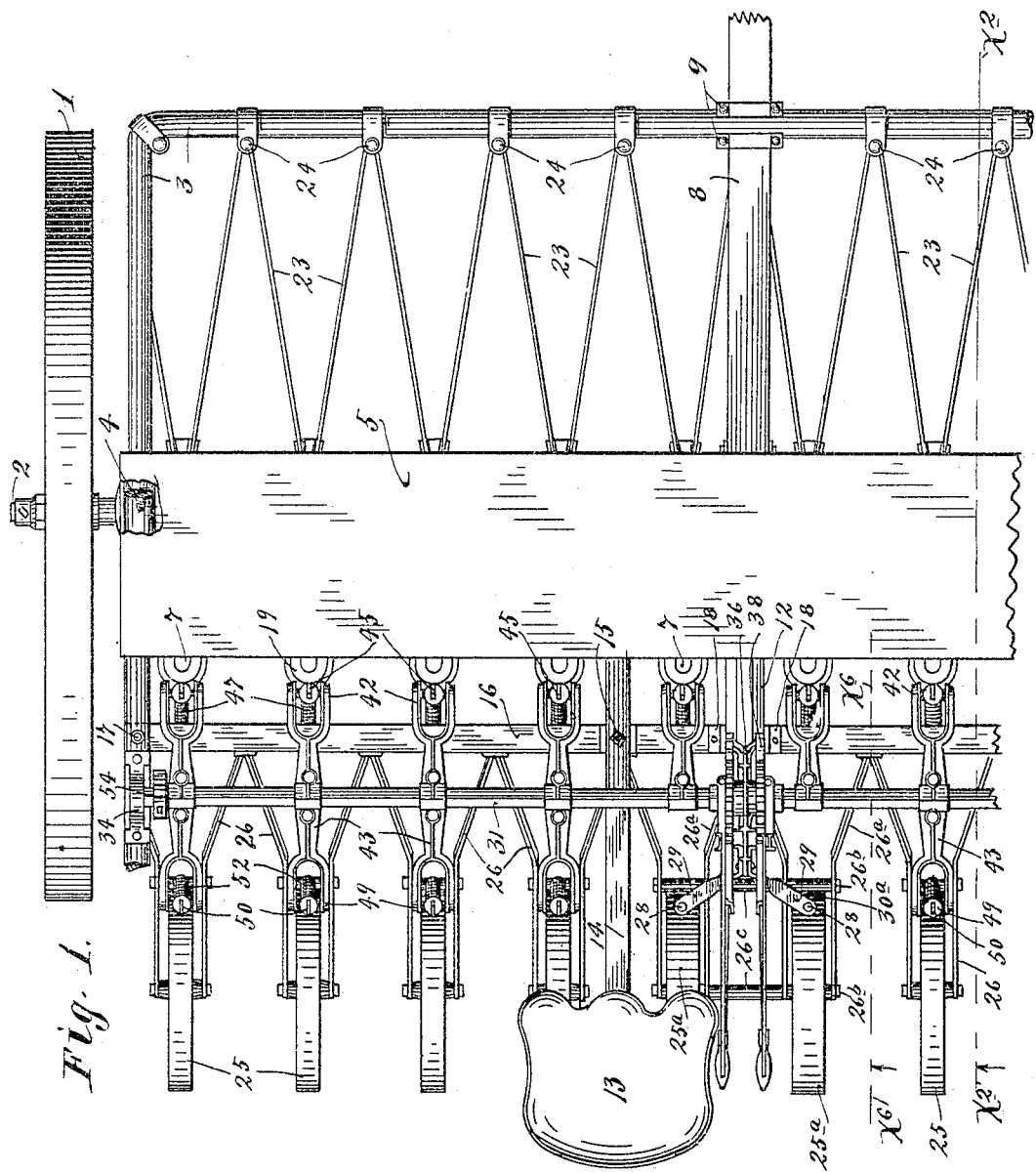
Figure 6:
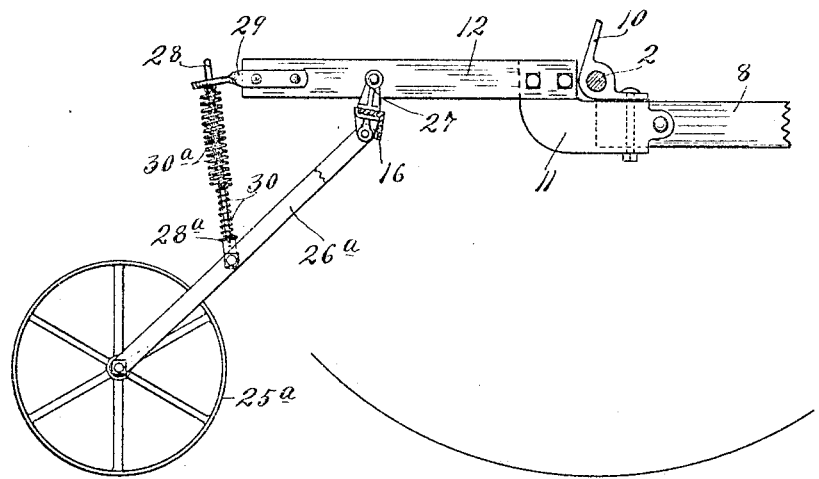
Figure 7:
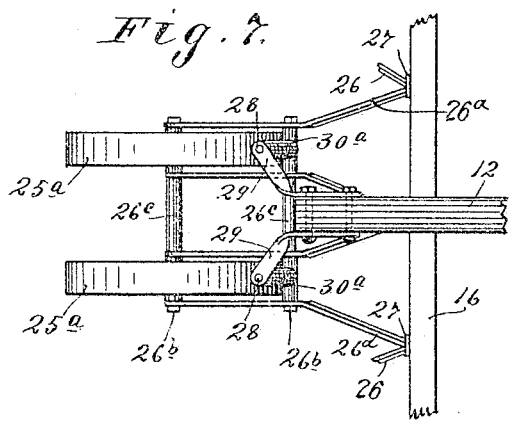

Figure 1 is a plan view, with parts broken away, showing a seeding-machine designed in accordance with my invention. Fig. 2 is a vertical section taken from front to rear of the machine on the line $x^3$ $x^3$ of Fig. 1, some parts being broken away. Fig. 3 is a transverse vertical section on the line $x^3$ $x^3$ of Fig. 2 with some parts broken away and with some parts removed. Fig. 4 is a detail in section on the line $x^4$ $x^4$ of Fig. 3. Fig. 5 is a view corresponding to Fig. 4, but with some parts removed. Fig. 6 is a detail view in section on the line $x^6$ $x^6$ of Fig. 1, and Fig. 7 is a plan view of the parts shown in Fig. 6.

The numeral 1 indicates one of a pair of large wheels which are loosely mounted on the ends of an axle 2. The main part of the machine-frame is, as shown, in the form of a pipe-section bent to form a large bail 3. The transverse portion of this frame-bail 3 extends at the front of the machine, and the intermediate portions of its backturned prongs are coupled to the axle 2 by bearing-brackets 4. The seed hopper or box 5, which is of the usual construction, extends transversely of the machine and is rigidly secured to the yoke 3 in a position overlying and close to axle 2. In the bottom of this hopper 5 is a transversely-spaced series of feed devices 6 of the usual or any suitable construction, which deliver the seed in the usual way into depending feed spouts or tubes 7.

The pole 8, which extends centrally and from front to rear of the machine, is rigidly united to the central transverse portion of the frame-bail 3, as shown, by a yoke-coupling 9. At its rear end the pole 8 is connected with the central portions of the axle 2 and hopper 5 by a bearing-bracket 10 and is provided with a tie-bracket 11, which rigidly connects it to a rear end pole extension 12.

The numeral 13 indicates a seat which is supported at the rear upper end of a seat-bar 14, the forward end of which is bolted or otherwise rigidly secured to the frame of the machine. As shown, the said seat-bar 14 is bolted at 15 to the tie-bar 16.

A transversely-extended tie-bar 16, as shown, in the form of an angle-iron is located, preferably, at the rear of the axle and is detachably secured to the frame of the machine, being, as shown, bolted to the rearwardly-projecting prongs of the frame-yoke 3 at 17 and having at its central portion rigidly secured brackets 18, which in turn are bolted to the pole extension 12.

The seed-delivery spouts or tubes 7 already noted deliver into the seed-boots 19 of disk-bearing brackets 20, which have the usual laterally-projecting trunnions 21, on which disks 22 are mounted. The supports 20 are rigidly connected to drag-bars 23, which at their forward ends are pivoted to the transverse portion of the frame-bail 3. As shown, the drag-bars 23 are made up of forwardly-diverging bars, the forward ends of which are pivoted to brackets 24, rigidly clamped on the transverse portion of the said frame-bail, as shown in Figs. 1 and 2. The furrow-opening devices are arranged in equal numbers on the opposite sides of the pole. It may be here stated that these furrow-opening disks may take various forms and in some instances will be in the form of shoes and in other in the form of hoes.

At the rear of the furrow-opening devices are so-called "press" or "covering wheels" 25 and 25ᵃ, which are journaled in the rear end of drag-bars 26 and 26ᵃ, respectively, the forward ends of which are preferably pivoted to the transverse tie-bar 16. As shown, each drag-bar 26 26ᵃ is made up of a pair of laterally-spaced straps, the forward ends of which are pivoted to lug-blocks 27, rigidly secured on the said tie-bar 16, as best shown in Figs. 2 and 3. The two press-wheels 25ᵃ at the center of the machine and approximately below the pole extension 12 are preferably wider faced than the press-wheels 25 and their drag-bars are advisably heavier than the drag-bars 26. The free end portions of the drag-bars 26ᵃ are advisably tied together and braced by transverse tie-bolts 26ᵇ and spacing-sleeves 26ᶜ. One of the bolts 26ᵇ, as shown, is passed through the hub of the two press-wheels 25ᵃ and affords pintles or spindles therefor.

The press-wheels 25ᵃ are kept constantly in contact with the ground. Spring-pressure devices involving thrust-rods 28 are pivotally attached at their lower ends to the intermediate portions of the drag-bars 26ᵃ and working at their upper ends freely through perforated brackets 29 on the pole extension 12. On each stem 28 is a coiled compression-spring 30, which reacts against the coöperating bracket 29 and against a washer 28ᵃ on the said stem. These springs 30 constantly exert a downward pressure on the press-wheels 25ᵃ. As shown, a short secondary spring 30ᵃ is placed around each spring 30. These springs 30ᵃ come into action to assist the springs 30 when the press-wheels 25 are raised, so as to throw additional weight upon the press-wheels 25ᵃ. The press-wheels 25ᵃ, therefore, at such time prevent the machine-frame from tilting downward at the rear to an objectionable extent, and hence prevent the pole from being thrown up at its forward end.

For pressing the furrow-opening devices and the press-wheels 25 to their work and for lifting them into operative position I provide a novel spring-pressure device, the preferred form of which is illustrated in the drawings and which will now be described.

Extending transversely of the machine, in the rear of the hopper 5, is a pair of parallel rock-shafts 31 and 32. Both of these rock-shafts are, as shown, sectioned or cut in two at their central portions. At their outer ends they fit into bearing-caps 33, that are mounted to rotate in bearing-standards 34, rigidly secured on the rearwardly-projecting prongs of the frame-yoke 3, as best shown in Figs. 3, 4, and 5. The inner ends of the said shaft-sections are fitted into bearing-caps 35, that are rotatively mounted in seats formed in a latch-bracket 36, rigidly secured on the pole extension 12. Rigidly secured to this bracket 36 is a pair of laterally-spaced latch-segments 38. Each latch-segment 38 is formed with a single lower lock-notch 39 and with a plurality of upper lock-notches 40. To the inner ends of the sections of the upper rock-shaft 31 are rigidly secured latch-levers 41, the latches of which coöperate with the notches of the respective adjacent latch-segments 38.

The rock-shafts 31 32 are both angular in cross-section. On the sections of the upper rock-shaft 31 are secured forwardly-projecting presser-arms 42, and on the sections of the lower rock-shaft 32 are likewise secured rearwardly-projecting presser-arms 43. The forward free ends of the presser-arms 42 are preferably pronged and carry pivoted presser-blocks 44. Lifting-rods 45, which are pivoted at their lower ends to the disk-supports 20, work freely through perforations in the presser-blocks 44, and above the said blocks are provided with stops 46, which limit the downward movements of said rods through the said blocks. Coiled springs 47 on the said rods 45 are compressed between said blocks 44 and fixed stops 48 on the said rods and serve to transmit downward pressure to the furrow-opening devices, as will presently more fully appear.

The presser-arms 43 are preferably pronged at their rear ends and carry pivoted presser-blocks 49. Lifting-rods 50 are pivoted at their lower ends to the drag-bars 26 and at their upper ends work freely through perforations in the said blocks 49, being provided above the said blocks with stops 51, that limit the downward movement of the said rods through said blocks. Coiled springs 52 on the rods 50 are compressed between the presser-blocks 49 and fixed stops 53 on the said rods.

The overlying sections of the two rock-shafts 31 and 32 are connected for reverse rotary or oscillatory movements by means of intermeshing spur-pinions 54, which, as shown, are adapted to slide on said shaft-sections, but are normally locked against such sliding movements by set-screws 55, as best shown in Figs. 3 and 4.

When the latch-levers 41 are thrown downward, so as to engage their latches with the lower notches 39 of the latch-segments 38, the arms 42 and 43 are thrown upward, and the lifting-rods 45 and 50, respectively, are caused to lift up the furrow-opening devices and the press-wheels or covering devices. When these devices are thus raised into inoperative positions, the excessive weight on the rear portion of the machine-frame will press the press-wheels 25ᵃ against the ground under increased force. No great amount of weight is, however, put upon the said wheels 25ᵃ; but the said wheels nevertheless serve to balance the machine. When the levers 41 are thrown forward, so as to engage their latches with one or the other of the notches 40 of the latch-segments 38, the furrow-opening devices, which, as shown, are the disks, and the presser-wheels 25, are yieldingly pressed downward to their work under a pressure depending on the positions of the said levers, it being of course evident that the farther forward the levers are moved the greater will be the compression of the springs 47 and 52.

With the pinions 54 intermeshed with each other in a given position the downward yielding pressure put upon the disks and upon the press-wheels will bear a predetermined relation to each other for each position of the lever 41. However, this predetermined relation may be changed at will by sliding one of the pinions 54 on its shaft out of mesh with the coöperating pinion and then bringing the said pinions again into mesh after first having turned one thereof and its shaft-section with respect to the other pinion and its shaft-section. This is an action much desired in order to set the pressure on the press-wheels according to the condition of the soil. For instance, in very dry soil greater pressure on the press-wheels for a furrow of given depth is desired than in damper soil. Furthermore, when a furrow-opening shoe is substituted for the disk a greater relative pressure on such furrow-opening device is required. The above means for adjusting the relative pressures on the two classes of devices is also important for this latter-noted purpose.

As is evident, the furrow-opening devices and the press-wheels 25 are simultaneously thrown into action and simultaneously thrown out of action by a common lever. Of course where the rock-shafts are divided two levers are required; but this is desirable in all machines of any considerable size, as it renders the machine easier to operate and enables one-half the machine to be thrown out of action to avoid obstructions without throwing the other half of the machine out of action.

By removing the tie-bar 16 from the frame of the machine and by unbolting bearings 34 and removing the shaft-sections 31 and 32 all of the press-wheels 25 may be removed from the machine. This permits the substitution of covering-chains or other form of covering devices for those illustrated in the drawings.

It is important to note that the drag-bars 23 may be readily disconnected from the transverse portion of the frame-yoke 3 and that the lifting-rods 45 may be readily disconnected from the disk-support 20 simply by the removal of bolts. This enables shoes or hoes to be quickly substituted for the disks.

From what has been said it will be understood that the machine described is capable of many modifications as to details of construction and arrangement of parts within the scope of my invention as herein set forth and claimed. The machine described has all the advantages of a so-called "low-down" drill without the objectionable features thereof.

The expression "press devices" is used in a broad sense to include devices which act on the furrow after the seeds have been deposited and either pack or scrape the soil into proper condition.

What I claim, and desire to secure by Letters Patent of the United States, is as follows:

1. In a machine of the character described, the combination with furrow-opening devices and with press devices, the said devices having independent drag-bars, for independently connecting them to the machine-frame, of rock-shafts having reversely-projecting presser-arms and connected for reverse rocking movements, yielding connections between the forwardly-projecting presser-arms and said furrow-opening devices, yielding connections between the rearward-projecting presser-arms and said press devices, and a lever operatively connected to one of said rock-shafts for simultaneously throwing the said two classes of devices into action and for simultaneously throwing them out of action, substantially as described.

2. In a machine of the character described, the combination with furrow-opening devices and press devices, said devices having independent drag-bars for independently connecting them to the machine-frame, of a pair of rock-shafts, one having forwardly-projecting presser-arms, and the other having rearwardly-projecting presser-arms, intermeshing pinions, one on each of said rock-shafts, one of which pinions is movable into and out of mesh with the other, so that the relative positions of the two shafts may be changed, yielding connections between the forwardly-projecting presser-arms and said furrow-opening devices, yielding connections between said rearwardly-projecting presser-arms and said press devices, a lever applied to one of said rock-shafts, and a latch-segment coöperating with said lever to hold the same in different positions, substantially as described.

3. In a machine of the character described, the combination with furrow-opening devices and press devices, of a lever having independent yielding connections to the said two classes of devices including a pair of arms, and means for adjusting said two arms with respect to each other, and thereby varying the relative compression of the said two yielding connections, substantially as described.

4. In a machine of the character described, the combination with a plurality of furrow-opening devices, of a plurality of press-wheels mounted to run behind said furrow-opening devices, some of said press-wheels being arranged to maintain continuous contact with the ground, and means for positively raising and lowering the other of the said press-wheels, substantially as described.

5. In a machine of the character described, the combination with a plurality of furrow-opening devices, of a plurality of press-wheels working at the rear of the furrow-opening devices, yielding means connecting some of said press-wheels to the machine-frame, for continuous contact with the ground, and means for raising and lowering the other of said press-wheels, substantially as described.

6. In a machine of the character described, the combination with a plurality of furrow-opening devices, of a plurality of press-wheels working at the rear of said furrow-opening devices, yielding means reacting against the machine-frame and pressing some of the press-wheels into a continuous contact with the ground, and lever-actuated spring-pressure mechanism operating on the other press-wheels and on said furrow-opening devices and involving means for raising and lowering the same, substantially as described.

7. In a machine of the character described, the combination of a plurality of furrow-opening devices, of a plurality of press-wheels having drag-bars connecting them to the machine-frame, the drag-bars of a pair of said press-wheels at a central portion of the machine, being rigidly tied together, spring-pressure devices operating on the said two tied drag-bars and reacting against the machine-frame, to press the said two press-wheels into continuous contact with the ground, and lever-actuated spring-pressure mechanism operating on the drag-bars of the other press-wheels and on the said furrow-opening devices and involving means for raising and lowering the same, substantially as described.

In testimony whereof I affix my signature in presence of two witnesses.

SPENCER E. DAVIS.

Witnesses:
R. C. MABEY,
F. D. MERCHANT.